(12) United States Patent
Lan et al.

(10) Patent No.: US 10,788,915 B2
(45) Date of Patent: Sep. 29, 2020

(54) FORCE SENSOR, DISPLAY PANEL, FORCE DETECTION METHOD

(71) Applicant: Xiamen Tianma Micro-Electronics Co., Ltd., Xiamen (CN)

(72) Inventors: Xuexin Lan, Xiamen (CN); Bozhi Liu, Xiamen (CN); Guozhao Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 51 days.

(21) Appl. No.: 16/214,492

(22) Filed: Dec. 10, 2018

(65) Prior Publication Data

US 2019/0286271 A1    Sep. 19, 2019

(30) Foreign Application Priority Data

Mar. 16, 2018 (CN) .......................... 2018 1 0216914

(51) Int. Cl.
*G06F 3/041* (2006.01)
*G01L 1/20* (2006.01)
*G01L 1/22* (2006.01)

(52) U.S. Cl.
CPC .............. *G06F 3/0414* (2013.01); *G01L 1/20* (2013.01); *G01L 1/2293* (2013.01); *G06F 3/0412* (2013.01); *G06F 3/0416* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 3,582,690 | A * | 6/1971 | Yerman | G01L 1/18 327/516 |
| 4,191,057 | A * | 3/1980 | Busta | G01L 1/2293 257/416 |
| 10,048,792 | B1 * | 8/2018 | Schediwy | G06F 3/0418 |
| 2007/0228500 | A1 * | 10/2007 | Shimazu | G01B 7/18 257/417 |
| 2015/0340630 | A1 * | 11/2015 | Im | H01L 51/0097 257/40 |
| 2017/0285799 | A1 * | 10/2017 | Iuchi | G06F 3/0414 |
| 2018/0024686 | A1 * | 1/2018 | Zhou | G06F 3/0412 345/174 |
| 2018/0150175 | A1 * | 5/2018 | Li | G06F 3/0412 |
| 2018/0181249 | A1 * | 6/2018 | Li | G06F 3/04142 |

* cited by examiner

*Primary Examiner* — Brian M Butcher
(74) *Attorney, Agent, or Firm* — Tarolli, Sundheim, Covell & Tummino LLP

(57) ABSTRACT

The present disclosure provides a force sensor, a display panel, and a force detection method. The force sensor includes a first input terminal, a second input terminal, a first output terminal, and a second output terminal. A first resistor is connected between the first input terminal and the first output terminal. A first transistor and a second transistor are connected in parallel between the first output terminal and the second input terminal. A third transistor and a fourth transistor are connected in parallel between the second input terminal and the second output terminal. A further first resistor is connected between the second output terminal and the first input terminal. An equivalent resistance of the first transistor is equal to that of the fourth transistor, and an equivalent resistance of the second transistor is equal to that of the third transistor.

12 Claims, 8 Drawing Sheets

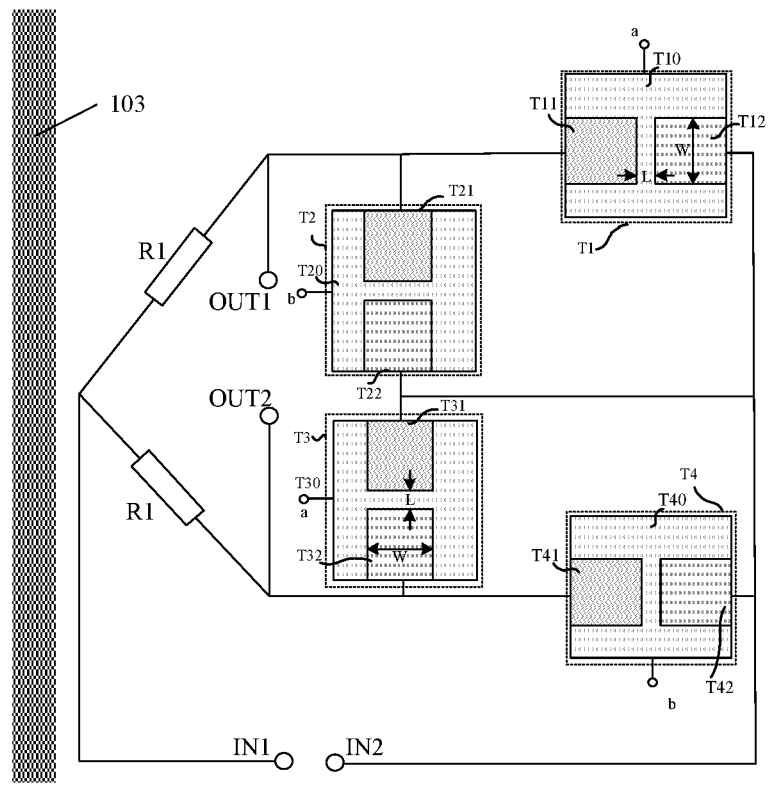

FIG. 13 during a first period of force detection, outputting a switch-on signal to the first transistor and the third transistor and outputting a switch-off signal to the second transistor and the fourth transistor; and obtaining a first force output value based on signals output from the first output terminal and the second output terminal — S1 during a second period of force detection, outputting a switch-off signal to the first transistor and the third transistor and outputting a switch-on signal to the second transistor and the fourth transistor; and obtaining a second force output value based on signals output from the first output terminal and the second output terminal — S2 obtaining a force detection value based on the first force output value and the second force output value — S3

FIG. 14

FORCE SENSOR, DISPLAY PANEL, FORCE DETECTION METHOD

CROSS-REFERENCE TO RELATED APPLICATIONS

The present application claims priority to Chinese Patent Application No. 201810216914.X, filed on Mar. 16, 2018, the content of which is incorporated herein by reference in its entirety.

TECHNICAL FIELD

The present disclosure relates to display technology, and more particularly, to a force sensor, a display panel, and a force detection method.

BACKGROUND

With the development of touch display technology, in addition to traditional touch technologies that can detect touch positions, a force touch technology that can detect a magnitude of a touch force has emerged, in order to better meet user requirements. The force touch technology usually needs to provide a force sensor in a display panel, and the force sensor is used to detect a magnitude of a force when the user touches the display panel.

However, in the related art, under influence of a peripheral circuit, a force detection signal output by the force sensor may be coupled with the peripheral circuit to generate noise, which affects the accuracy of the force detection signal output by the force sensor.

SUMMARY

The present application provides a force sensor, a display panel, and a force detection method, aiming to improve accuracy of a force detection signal output from the force sensor.

In a first aspect, the present disclosure provides a force sensor. The force sensor includes: a first input terminal, a second input terminal, a first output terminal, a second output terminal, a first resistor connected between the first input terminal and the first output terminal, first and second transistors connected in parallel between the first output terminal and the second input terminal, third and fourth transistors connected in parallel between the second input terminal and the second output terminal, and a further first resistor connected between the second output terminal and the first input terminal. An equivalent resistance of the first transistor is equal to an equivalent resistance of the fourth transistor, and an equivalent resistance of the second transistor is equal to an equivalent resistance of the third transistor.

In a second aspect, the present disclosure provides a display panel. The display panel includes the force sensor according to the first aspect of the present disclosure.

In a third aspect, the present disclosure provides a force detection method applied in the display panel according to the second aspect of the present disclosure. The force detection method includes: during a first period of force detection, outputting a switch-on signal to the first transistor and the third transistor and outputting a switch-off signal to the second transistor and the fourth transistor; and obtaining a first force output value based on signals output from the first output terminal and the second output terminal; during a second period of force detection, outputting a switch-off signal to the first transistor and the third transistor and outputting a switch-on signal to the second transistor and the fourth transistor; and obtaining a second force output value based on signals output from the first output terminal and the second output terminal; and obtaining a force detection value based on the first force output value and the second force output value.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

FIG. 13 is an enlarged view of a dotted box in FIG. 12.

FIG. 14 is a flowchart showing a force detection method according to an embodiment of the present disclosure.

DESCRIPTION OF EMBODIMENTS

In order to better understand technical solutions of the present disclosure, the embodiments of the present disclosure are described in details with reference to the drawings. It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first' and 'second' may be used in the present disclosure to describe transistors, the transistors should not be limited to these terms. These terms are used only to distinguish the transistors from each other. For example, without departing from the scope of the embodiments of the present disclosure, a first transistor may also be referred to as a second transistor. Similarly, the second transistor may also be referred to as the first transistor.

Figure 1:
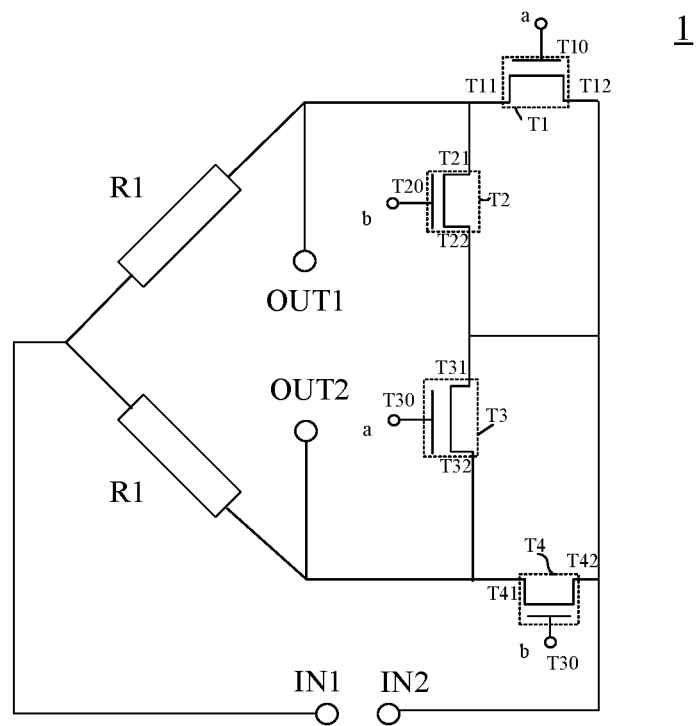
FIG. 1 is a structural schematic diagram of a force sensor according to an embodiment of the present disclosure.

The embodiments of the present disclosure provide a force sensor as shown in FIG. 1. FIG. 1 is a structural schematic diagram of a force sensor according to an embodiment of the present disclosure. The force sensor 1 includes a first input terminal IN1, a second input terminal IN2, a first output terminal OUT1, and a second output terminal OUT2. A first resistor R1 is connected between the first input terminal IN1 and the first output terminal OUT1. A first transistor T1 and a second transistor T2 are connected in parallel between the first output terminal OUT1 and the second input terminal IN2. A third transistor T3 and a fourth transistor T4 are connected in parallel between the second input terminal IN2 and the second output terminal OUT2. A further first resistor R1 is connected between the second output terminal OUT2 and the first input terminal IN1. An equivalent resistance of the first transistor T1 is equal to an equivalent resistance of the fourth transistor T4, and an equivalent resistance of the second transistor T2 is equal to an equivalent resistance of the third transistor T3.

Figure 2:
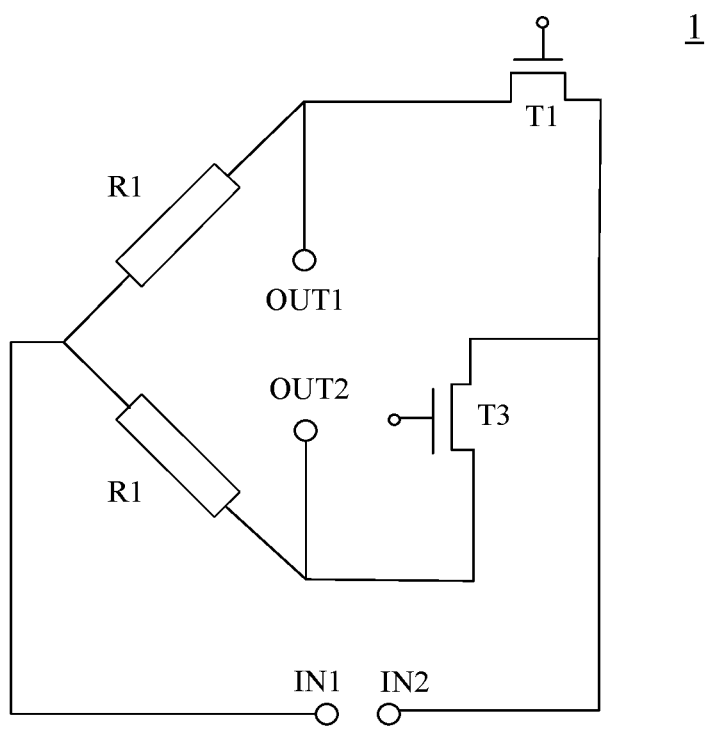
FIG. 2 is a structural schematic diagram of a force sensor in a first period of force detection according to an embodiment of the present disclosure.
Figure 3:
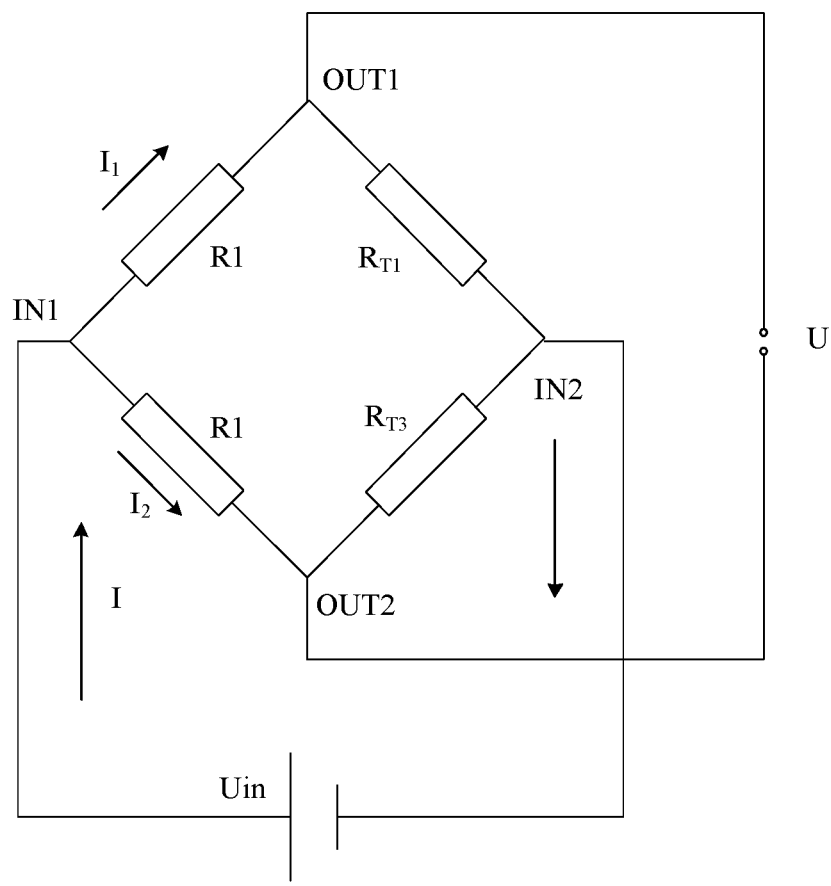
FIG. 3 is an equivalent circuit diagram of FIG. 2.

When the force sensor 1 operates, the force sensor 1 is provided with a bias voltage for operation via the first input terminal IN1 and the second input terminal IN2. During a first period of force detection, a switch-on signal is output to the first transistor T1 and the third transistor T3 and a switch-off signal is output to the second transistor T2 and the fourth transistor T4. That is, the first transistor T1 and the third transistor T3 are switched on, and the second transistor T2 and the fourth transistor T4 are switched off. Then, two first resistors R1, the first transistor T1 and the third transistor T3 form four bridge arms of a Wheatstone bridge. FIG. 2 is a structural schematic diagram of a force sensor in a first period of force detection according to an embodiment of the present disclosure. As shown in FIG. 2, when the first transistor T1 and the third transistor T3 are switched on, the first transistor T1 and the third transistor T3 are equivalent to two resistors. For example, an equivalent resistance of the first transistor T1 is $R_{T1}$ and an equivalent resistance of the third transistor T3 is $R_{T3}$. FIG. 3 is an equivalent circuit diagram of FIG. 2. According to the present disclosure, a stress detected by the force sensor can be obtained by calculating a voltage difference between the first output terminal OUT1 and the second output terminal OUT2 of the force sensor. For example, the force sensor is provided with a bias voltage $U_{in}$, and a voltage $U_{OUT1}$ at the first output terminal OUT1 is:

$$U_{OUT1} = U_{in} - I_1 R1 \qquad (1).$$

A voltage $U_{OUT2}$ at the second output terminal OUT2 is:

$$U_{OUT2} = U_{in} - I_2 R1 \qquad (2),$$

where $I_1$ is a current passing through the first resistor R1 and the first transistor T1, and satisfies:

$$I_1 = \frac{U_{in}}{R1 + R_{T1}}, \qquad (3)$$

and I2 is a current passing through the first resistor R1 and the third transistor T3, and satisfies:

$$I_2 = \frac{U_{in}}{R1 + R_{T3}}. \qquad (4)$$

When there is no external force applied on the force sensor 1, the equivalent resistance of the first transistor T1 can be set to be equal to the equivalent resistance of the third transistor T3. Alternatively, when the equivalent resistance of the first transistor T1 is different from the equivalent resistance of the third transistor T3, the calculation can be performed by means of background deduction, so that $I_1=I_2$ and then $U_{OUT1}=U_{OUT2}$. That is, a voltage output at the first output terminal OUT1 is equal to a voltage output at the second output terminal OUT2, and then the bridge is in balance.

When there is an external force applied on the force sensor 1, the equivalent resistance of the first transistor T1 and the equivalent resistance of the third transistor T3 will change due to the external force in such a manner that a voltage at the first output terminal OUT1 is not equal to a voltage at the second output terminal OUT2. Moreover, since a difference between the voltage at the first output terminal OUT1 and the voltage at the second output terminal OUT2 is in a positive correlation with a force applied on the force sensor 1, i.e., the force applied on the force sensor 1 increases as the difference between the voltage at the first output terminal OUT1 and the voltage at the second output terminal OUT2 increases, a magnitude of the force can be detected based on the difference according to the present disclosure. In particular, when there is an external force applied on the force sensor 1, assuming that the equivalent resistance of the first transistor T1 has changed into $R_{T1}'$ and the equivalent resistance of the third transistor T3 has changed into $R_{T3}'$, a current $I_1$ passing through the first resistor R1 and the first transistor T1 meets:

$$I_1 = \frac{U_{in}}{R1 + R_{T1}'}, \qquad (5)$$

and a current $I_2$ passing through the first resistor R1 and the third transistor T3 meets:

$$I_2 = \frac{U_{in}}{R1 + R_{T3}'}. \qquad (6)$$

Then, the voltage $U_{OUT1}$ at the first output terminal OUT1 can be:

$$U_{OUT1} = U_{in} - I_1 R1 = U_{in} - \frac{U_{in} R1}{R1 + R_{T1}'}, \qquad (7)$$

and the voltage $U_{OUT2}$ at the second output terminal OUT2 can be:

$$U_{OUT2} = U_{in} - I_2 R1 = U_{in} - \frac{U_{in} R1}{R1 + R'_{T3}}. \tag{8}$$

Considering the influence of noise σ, a force value actually detected by the force sensor is:

$$U_1 = U_{in} R1 \left( \frac{1}{R1 + R'_{T3}} - \frac{1}{R1 + R'_{T1}} \right) + \sigma. \tag{9}$$

Figure 4:
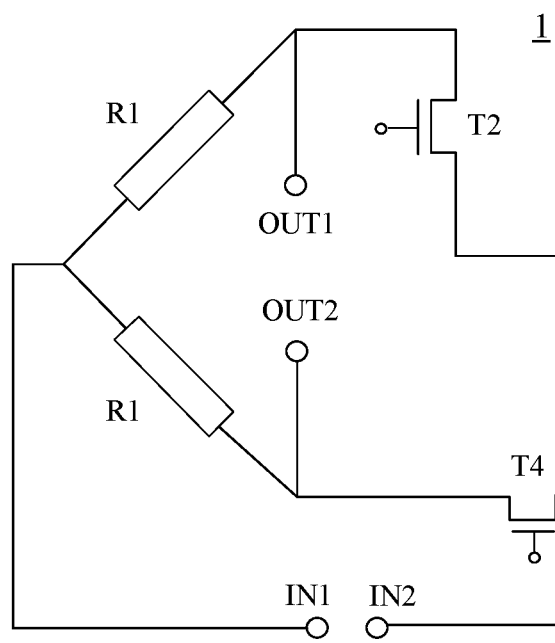
FIG. 4 is a structural schematic diagram of a force sensor in a second period of force detection according to an embodiment of the present disclosure.
Figure 5:
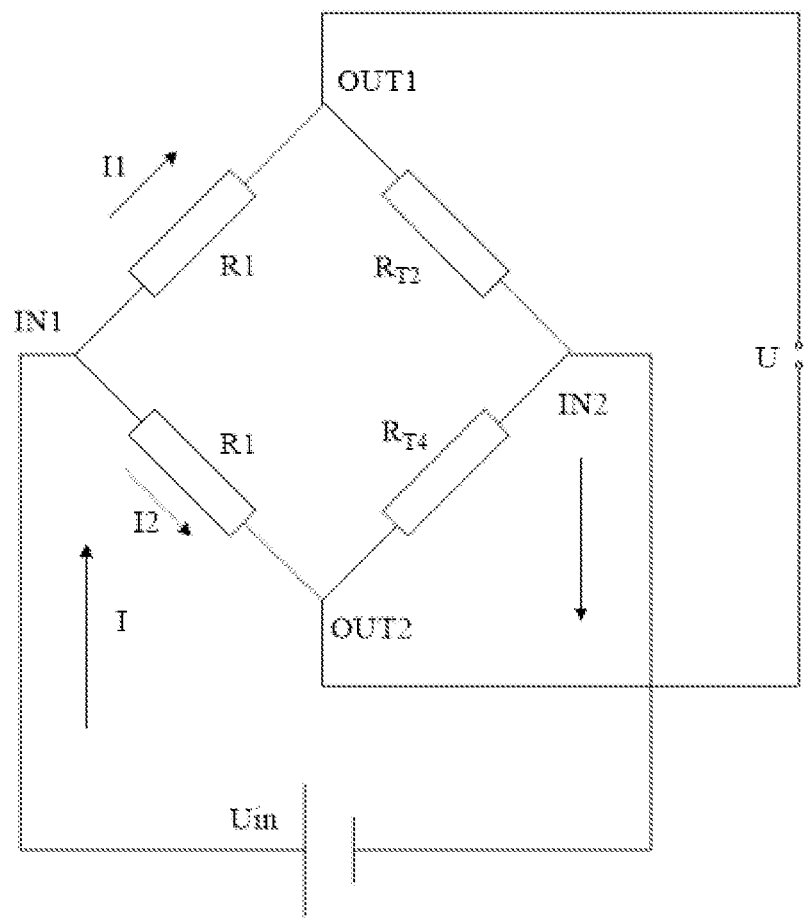
FIG. 5 is an equivalent circuit diagram of FIG. 4.

During a second period of force detection, a switch-off signal is output to the first transistor T1 and the third transistor T3 and a switch-on signal is output to the second transistor T2 and the fourth transistor T4. That is, the first transistor T1 and the third transistor T3 are switched off, and the second transistor T2 and the fourth transistor T4 are switched on. Then, two first resistors R1, the second transistor T2 and the fourth transistor T4 form four bridge arms of a Wheatstone bridge. FIG. 4 is a structural schematic diagram of a force sensor in a second period of force detection according to an embodiment of the present disclosure. As shown in FIG. 4, when the second transistor T2 and the fourth transistor T4 are switched on, the second transistor T2 and the fourth transistor T4 are equivalent to two resistors. The equivalent resistance of the second transistor T2 is equal to that of the third transistor T3, and the equivalent resistance of the fourth transistor T4 is equal to that of the first transistor T1. Therefore, as shown in FIG. 5 showing an equivalent circuit diagram of FIG. 4, when there is no external force applied on the force sensor 1, similar to the first period of force detection, the present disclosure can set the equivalent resistance of the second transistor T2 to be equal to that of the fourth transistor T4. Alternatively, when the equivalent resistance of the second transistor T2 is different from that of the fourth transistor T4, the calculation can be performed by means of background deduction, so that $I_1=I_2$ and then $U_{OUT1}=U_{OUT2}$. That is, a voltage output at the first output terminal OUT1 is equal to a voltage output at the second output terminal OUT2, and then the bridge is in balance.

When there is an external force applied on the force sensor 1, the equivalent resistance of the second transistor T2 and the equivalent resistance of the fourth transistor T4 will change due to the external force in such a manner that a voltage at the first output terminal OUT1 is not equal to a voltage at the second output terminal OUT2. Therefore, the force detection value can be obtained based on the difference. In particular, when there is an external force applied on the force sensor 1, assuming that the equivalent resistance of the second transistor T2 has changed into $R_{T2}'$ and the equivalent resistance of the fourth transistor T4 has changed into $R_{T4}'$, a current $I_1$ passing through the first resistor R1 and the second transistor T2 meets:

$$I_1 = \frac{U_{in}}{R1 + R'_{T2}}, \tag{10}$$

and a current $I_2$ passing through the first resistor R1 and the fourth transistor T4 meets:

$$I_2 = \frac{U_{in}}{R1 + R'_{T4}}. \tag{11}$$

Then, the voltage $U_{OUT1}$ at the first output terminal OUT1 can be:

$$U_{OUT1} = U_{in} - I_1 R1 = U_{in} - \frac{U_{in} R1}{R1 + R'_{T2}}, \tag{12}$$

and the voltage $U_{OUT2}$ at the second output terminal OUT2 can be:

$$U_{OUT2} = U_{in} - I_2 R1 = U_{in} - \frac{U_{in} R1}{R1 + R'_{T4}}. \tag{13}$$

Considering the influence of noise σ, a force value actually detected by the force sensor during the second period of force detection can be:

$$U_2 = U_{in} R1 \left( \frac{1}{R1 + R'_{T4}} - \frac{1}{R1 + R'_{T2}} \right) + \sigma. \tag{14}$$

Moreover, by setting the equivalent resistance $R_{T1}'$ of the first transistor T1 to be equal to the equivalent resistance $R_{T4}'$ of the fourth transistor T4 and setting the equivalent resistance $R_{T2}'$ of the second transistor T2 to be equal to the equivalent resistance $R_{T3}'$ of the third transistor T3, it can be calculated as:

$$U_2 = U_{in} R1 \left( \frac{1}{R1 + R'_{T1}} - \frac{1}{R1 + R'_{T3}} \right) + \sigma. \tag{15}$$

Then, a difference between $U_1$ and $U_2$ can be obtained as a final force detection value, which can offset the influence of noise while improving the accuracy of the signal detection by the force sensor.

Figure 6:
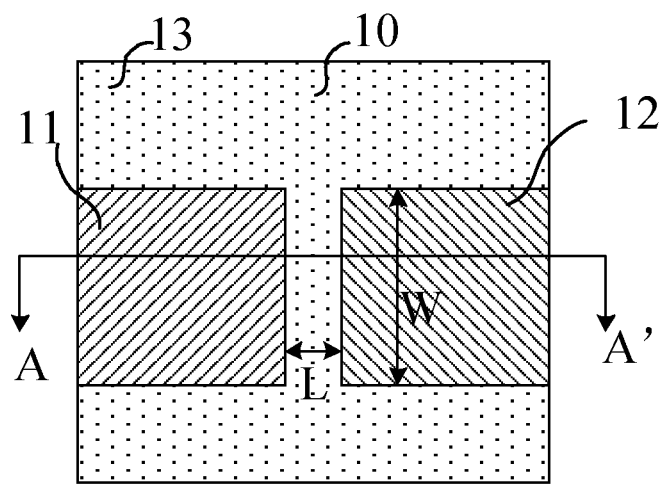
FIG. 6 is a structural schematic diagram of a transistor according to an embodiment of the present disclosure.
Figure 7:
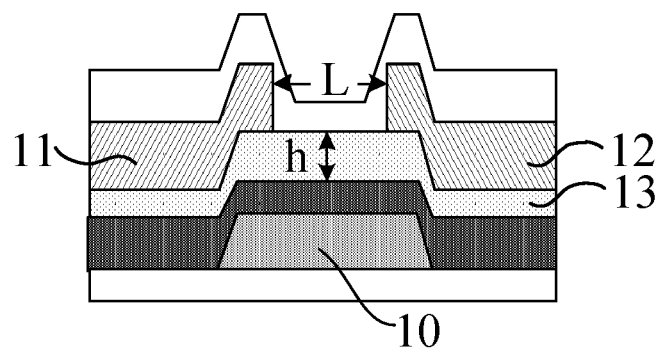
FIG. 7 is a cross-sectional diagram along AA' in FIG. 6.

For example, as shown in FIGS. 6 and 7, FIG. 6 is a structural schematic diagram of a transistor according to an embodiment of the present disclosure, and FIG. 7 is a cross-sectional diagram along AA' in FIG. 6. The transistor includes a gate electrode 10, a first electrode 11, a second electrode 12, and an active layer 13. FIG. 7 exemplifies a bottom-gate type transistor. It should be noted that the present disclosure may also adopt a top-gate type transistor.

When the transistor operates, the gate electrode 10 can be provided with a signal for controlling the transistor to be switched on or switched off. For example, when a signal for controlling the transistor to be switched on is applied to the gate electrode 10, the signal will flow from the first electrode 11, through the active layer 13 between the first electrode 11 and the second electrode 12, and to the second electrode 12. Then, a channel formed by the active layer 13 between the first electrode 11 and the second electrode 12 of the transistor can be equivalent to one resistor element. In particular, as shown in FIGS. 6 and 7, a length of a part of the active layer 13 between the first electrode 11 and the second electrode 12 is a length L of the channel, a width of the first electrode 11 and the second electrode 12 is a width W of the channel, and a thickness h of the active layer is a thickness h of the channel. In other words, a part of the active layer 13 between the first electrode 11 and the second electrode 12 forms a channel, which is equivalent to a resistor element having a length L, a width W and a height h. When there is an external stress applied on the transistor, a shape of the channel formed by the part of the active layer 13 between the first electrode 11 and the second electrode 12 will change in such a manner that the resistor element equivalent to the channel has its length and width changed according to a resistance formula as follows:

$$R = \frac{\rho L}{S} = \frac{\rho L}{Wh}, \quad (16)$$

wherein ρ is of a resistivity of the resistor element, L is a length of the resistor, S is a cross-sectional area of the resistor, W is a width of the resistor, and h is a height of the resistor. It can be seen from the formula (16) that when the length L and the width W of the channel change, the equivalent resistance of the transistor will also change accordingly.

Optionally, the first transistor T1, the second transistor T2, the third transistor T3, and the fourth transistor T4 can be of the same type. For example, each of the first transistor T1, the second transistor T2, the third transistor T3, and the fourth transistor T4 can be a P-type transistor or an N-type transistor.

Figure 8:
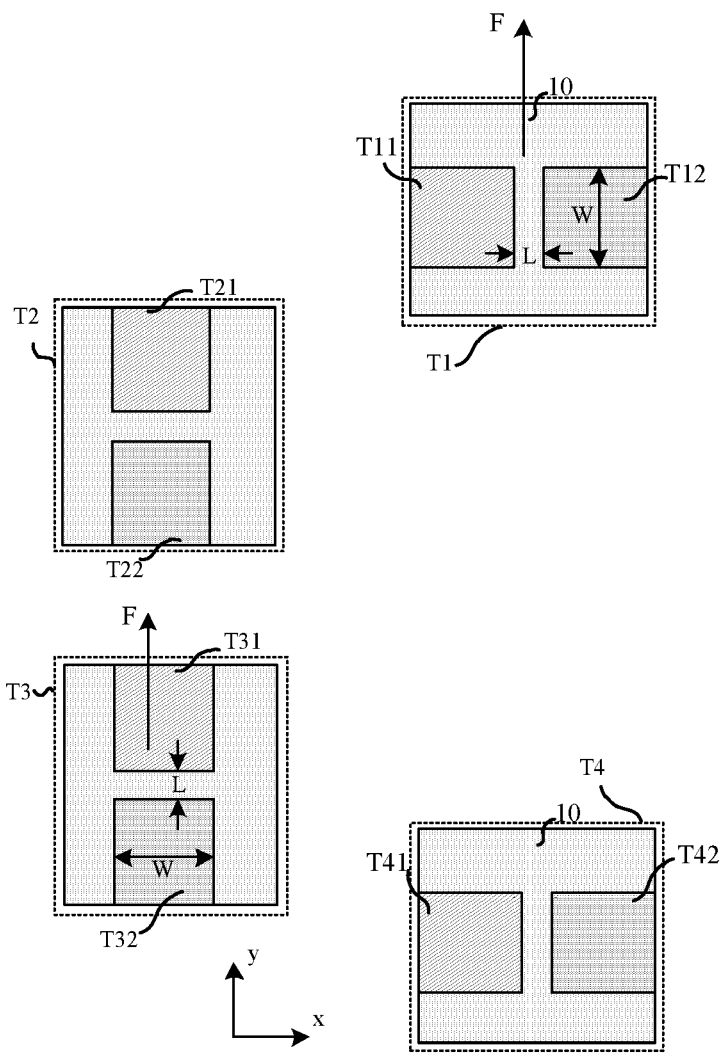
FIG. 8 is a position diagram showing positions of a first transistor, a second transistor, a third transistor and a fourth transistor according to an embodiment of the present disclosure.

For example, a position diagram showing positions of a first transistor, a second transistor, a third transistor and a fourth transistor according to an embodiment of the present disclosure is shown in FIG. 8. A first electrode T11 and a second electrode T12 of the first transistor T1 are arranged along a first direction x. A first electrode T31 and a second electrode T32 of the third transistor T3 are arranged along a second direction y. A first electrode T21 and a second electrode T22 of the second transistor T2 are arranged along the second direction y. A first electrode T41 and a second electrode T42 of the fourth transistor T4 are arranged along the first direction x. Moreover, the first direction x is different from the second direction y. According to the present embodiment, an arrangement direction of the first electrode T11 and the second electrode T12 of the first transistor T1 is set as different from an arrangement direction of the first electrode T31 and the second electrode T32 of the third transistor T3. In this way, when the first transistor T1 and the third transistor T3 are switched on to be involved in the force detection, due to the different arrangement directions, the equivalent resistances of the first transistor T1 and the third transistor T3 will experience different changes under the force. For example, assuming that a force F along the direction y is applied on the force sensor, the length L of the channel of the first transistor T1 will decrease and the width W of the channel will increase under the force F. It can be seen from the formula (16) that the equivalent resistance of the first transistor T1 will decrease. That is, changes of the equivalent resistance of the first transistor T1 and the equivalent resistance of the third transistor T3 are different. Then, in the force detection, the balance of the bridge without any stress can be broken, so that there is a difference between voltages at the first output terminal OUT1 and the second output terminal OUT2 of the force sensor, and then the applied stress can be detected. Similarly, the present disclosure can further set an arrangement direction of the first electrode T21 and the second electrode T22 of the second transistor T2 to be different from an arrangement direction of the first electrode T41 and the second electrode T42 of the fourth transistor T4, so that when the second transistor T2 and the fourth transistor T4 are switched on to be involved in the force detection, and the balance of the bridge without any stress can be broken likewise. In this way, there is a difference between voltages at the first output terminal OUT1 and the second output terminal OUT2 of the force sensor, and then the applied stress can be detected.

Optionally, as shown in FIG. 8, the first direction x is perpendicular to the second direction y, so that during the force detection, there is a biggest difference between a change of the equivalent resistance of the first transistor T1 and a change of the equivalent resistance of the third transistor T3, and a biggest difference between a change of the equivalent resistance of the second transistor T2 and a change of the equivalent resistance of the fourth transistor T4, thereby improving detection accuracy of the force detection. As shown in FIG. 8, for example, the first transistor T1 and the third transistor T3 are switched on to be involved in the force detection, and a direction of the force F applied on the force sensor is the same as the arrangement direction y of the first electrode T31 and the second electrode T32 of the third transistor T3. In this case, since the arrangement direction x of the first electrode T11 and the second electrode T12 of the first transistor T1 is perpendicular to the direction y, the force F applied on the first transistor T1 has a component of zero along a direction parallel to the arrangement direction x of the first electrode T11 and the second electrode T12 of the first transistor T1, and has a component of F along a direction perpendicular to the arrangement direction x of the first electrode T11 and the second electrode T12 of the first transistor T1. The force F applied on the third transistor T3 has a component of F along a direction parallel to the arrangement direction y of the first electrode T31 and the second electrode T31 of the third transistor T3, and has a component of zero along a direction perpendicular to the arrangement direction y of the first electrode T31 and the second electrode T31 of the third transistor T3. In other words, the first transistor T1 is subjected to a force in a direction perpendicular to the arrangement direction of the first electrode T11 and the second electrode T12, and the third transistor T3 is subjected to a force in a direction in parallel to the arrangement direction of the first electrode T31 and the second electrode T32. Therefore, as for the first transistor T1 and the third transistor T3, directions of forces applied on respective channels are perpendicular to each other. Correspondingly, channels of the first transistor T1 and the third transistor T3 can have respective deformations in two directions that are perpendicular to each other, and then lead to different resistance changes. In this way, voltage outputs at the first output terminal OUT1 and the second output terminal OUT2 will change, and thus the magnitude of the force applied on the force sensor can be detected.

Figure 9:
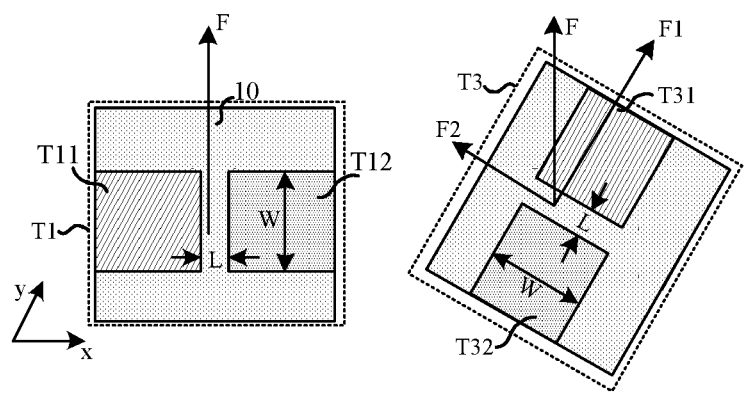
FIG. 9 is a position diagram in which an arrangement direction of first and second electrodes of a first transistor is not perpendicular to an arrangement direction of first and second electrodes of a third transistor.

It is possible that the arrangement direction of the first electrode T11 and the second electrode T12 of the first transistor T1 is not perpendicular to the arrangement direction of the first electrode T31 and the second electrode T32 of the third transistor T3. FIG. 9 shows a position diagram in which the arrangement direction of the first electrode T11 and the second electrode T12 of the first transistor T1 is not perpendicular to the arrangement direction of the first electrode T31 and the second electrode T32 of the third transistor T3. Still taking the direction in which the force F is applied of FIG. 8 as an example, after being applied on the third transistor T3, the force F can be decomposed into a component F1 in a direction parallel to the arrangement direction of the first electrode T31 and the second electrode T32 and a component F2 perpendicular to the arrangement direction of the first electrode T31 and the second electrode T32; as for the first transistor T1, the force F has a component of zero in a direction parallel to the arrangement direction of the first electrode T11 and the second electrode T12 and a component of F in a direction perpendicular to the arrangement direction of the first electrode T11 and the second electrode T12. That is, each of the first transistor T1 and the third transistor T3 is subjected to a force in a direction perpendicular to an arrangement direction of the respective first and second electrodes. Therefore, under the function of the force, a part of the first transistor T1 and a part of the third transistor T3 can have an identical deformation, which correspondingly can lead to the same resistance change. In this way, the force F would cause a small resistance difference between the first transistor T1 and the third transistor T3, so that there would be a small difference between voltage outputs at the first output terminal OUT1 and the second output terminal OUT2, thereby affecting detection accuracy of the force detection.

Figure 10:
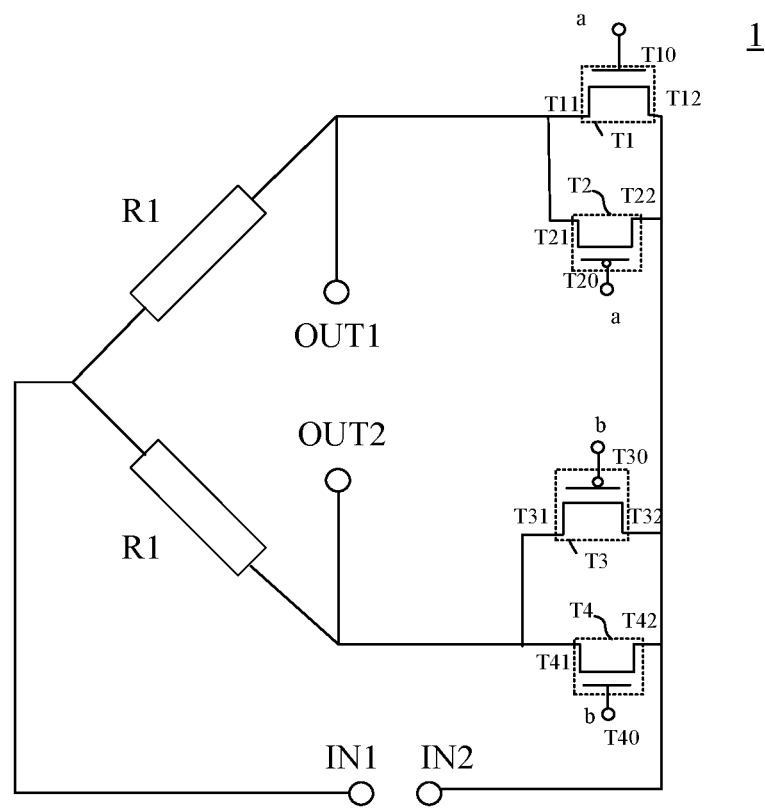
FIG. 10 is another structural schematic diagram of a force sensor according to an embodiment of the present disclosure.

Alternatively, the present disclosure can further set the first transistor T1 and the third transistor T3 as different types, and set the second transistor T2 and the fourth transistor T4 as different types. For example, as shown in FIG. 10, which is another structural schematic diagram of a force sensor according to an embodiment of the present disclosure, the second transistor T2 and the third transistor T3 are both P-type transistors, and the first transistor T1 and the fourth transistor T4 are both N-type transistors.

A P-type transistor and an N-type transistor have opposite strain sensitivity coefficients. That is, when an identical deformation occurs, a resistance of the P-type transistor increases while a resistance of the N-type transistor decreases. According to the present disclosure, arrangement directions of first and second electrodes of the first transistor T1 and the third transistor T3 involved in the force detection at the same time can be set as either the same or different, and arrangement directions of first and second electrodes of the second transistor T2 and the fourth transistor T4 involved in the force detection at the same time can be set as either the same or different.

When the arrangement directions of first and second electrodes of the first transistor T1 and the third transistor T3 involved in the force detection at the same time are set as different, under a stress, change directions of deformations of channels of the first transistor T1 and the third transistor T3 are also different. Considering that the first transistor T1 and the third transistor T3 have different strain sensitivity coefficients, a special setting on arrangement directions of the first transistor T1 and the third transistor T3 is needed in the present disclosure, so as to avoid consistent variations of their final resistances due to a difference in channel deformations between the first transistor T1 and the third transistor T3 and a difference in their strain sensitivity coefficients, which would otherwise lead to failure in breaking the balanced state of the bridge subjected to no force during the force detection. Similarly, when the arrangement direction of the first electrode T21 and the second electrode T22 of the second transistor T2 and the arrangement direction of the first electrode T41 and the second electrode T42 of the fourth transistor T4 involved in the force detection at the same time are set as different, it the arrangement directions of first and second electrodes of the second transistor T2 and the fourth transistor T4 involved in the force detection at the same time are set as different, a special setting on the arrangement direction of the first electrode T21 and the second electrode T22 of the second transistor T2 and the arrangement direction of the first electrode T41 and the second electrode T42 of the fourth transistor T4 is also needed in the present disclosure, so as to avoid the failure in breaking the balanced state of the bridge subjected to no force during the force detection.

Figure 11:
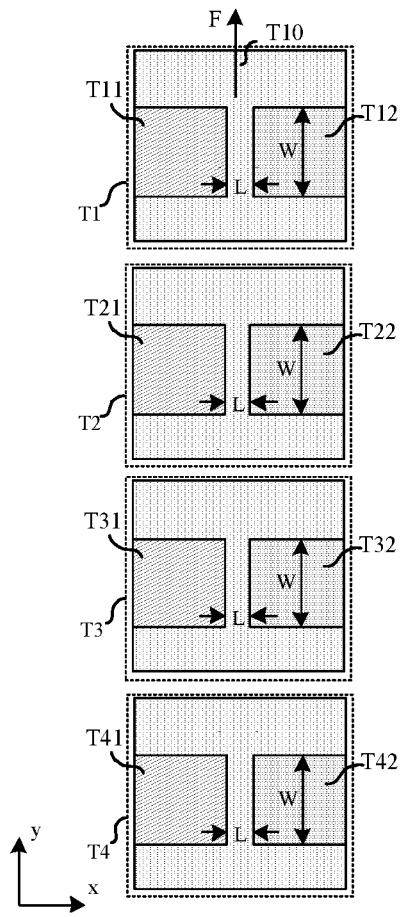
FIG. 11 is another position diagram showing positions of a first transistor, a second transistor, a third transistor and a fourth transistor according to an embodiment of the present disclosure.

FIG. 11 is another position diagram showing positions of a first transistor, a second transistor, a third transistor and a fourth transistor according to an embodiment of the present disclosure. As shown in FIG. 11, an arrangement direction of the first electrode T11 and the second electrode T12 of the first transistor T1 is the same as an arrangement direction of the first electrode T31 and the second electrode T32 of the third transistor T3, and an arrangement direction of the first electrode T21 and the second electrode T22 of the second transistor T2 is the same as an arrangement direction of the first electrode T41 and the second electrode T42 of the fourth transistor T4. In this way, the four transistors can be manufactured by using the same technology, thereby facilitating the manufacture. Moreover, by setting arrangement directions of the first and second electrodes of the first transistor T1 and the third transistor T3, which are of different types and operate at the same time, as the same, the present disclosure can allow the first transistor T1 and the third transistor T3 to have the same strain under the same stress; and since a P-type transistor and an N-type transistor have opposite strain sensitivity coefficients, the first transistor T1 and the third transistor T3 can have opposite resistance changes. Similarly, by setting arrangement directions of the first and second electrodes of the second transistor T2 and the fourth transistor T4, which are of different types and operate at the same time, as the same, the present disclosure can allow the second transistor T2 and the fourth transistor T4 to have the same strain under the same stress, and thus can allow the second transistor T2 and the fourth transistor T4 to have opposite resistance changes. This can break the balanced state of the bridge without any strain during the force detection, and then the applied stress can be detected.

It should be noted that FIG. 10 exemplifies the first transistor T1 and the fourth transistor T4 as N-type transistors and the second transistor T2 and the third transistor T3 as P-type transistors, but in the practice design, it is possible to set the first transistor T1 and the fourth transistor T4 as P-type transistors and the second transistor T2 and the third transistor T3 as N-type transistors. The corresponding operations and principles are the same as the above case, and will not be repeated here.

Figure 12:
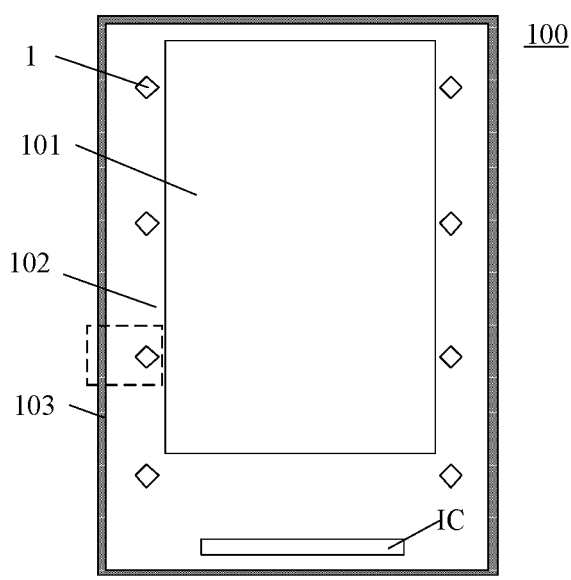
FIG. 12 is a schematic diagram of a display panel according to an embodiment of the present disclosure.

The embodiments of the present disclosure further provide a display panel 10, as shown in FIG. 12. FIG. 12 is a schematic diagram of a display panel according to an embodiment of the present disclosure. The display panel 100 includes the force sensor 1 as described above.

When the display panel 100 operates, a stress applied on the display panel 100 can be detected by using the force sensor 1. The present disclose provides the force sensor 1 in the display panel 100, which can alleviate the influence of the surrounding noise, thereby improving accuracy of the force detection in the display panel 100. Moreover, according to the present disclosure, since transistors are used to form bridge arms of a Wheatstone bridge for detecting a stress, the first transistor, the second transistor, the third transistor and the fourth transistor can be controlled to be switched on in a time division manner, so that different transistors can be involved in the force detection during different periods of the force detection. In particular, during a first period of the force detection, a switch-on signal is output to the first transistor and the third transistor and a switch-off signal is output to the second transistor and the fourth transistor, so that the first transistor, the third transistor and two first resistors form four bridge arms of a Wheatstone bridge. During a second period of the force detection, a switch-on signal is outputted to the second transistor and the fourth transistor and a switch-off signal is outputted to the first transistor and the third transistor, so that the second transistor, the fourth transistor and two first resistors form four bridge arms of a Wheatstone bridge. That is, the present embodiment integrates the Wheatstone bridge for detection during the first period of the force detection and the Wheatstone bridge for detection during the second period of the force detection into a whole, without setting two bridges for use in the first period of the force detection and the second period of the force detection respectively. This can reduce the number of the bridges, and then when the force sensor 1 is used in the display panel 100, a smaller area can be occupied, thereby implementing narrow borders for the display panel 100.

As shown in FIG. 12, the display panel 100 further includes a driving chip IC. In particular, as shown in FIG. 1, when respective transistors are of the same type, a gate electrode T10 of the first transistor T1 is connected to a first port a of the driving chip IC, a first electrode T11 of the first transistor T1 is connected to the first output terminal OUT1, and a second electrode T12 of the first transistor T1 is connected to the second input terminal IN2; a gate electrode T20 of the second transistor T2 is connected to a second port b of the driving chip IC, a first electrode T21 of the second transistor T2 is connected to the first output terminal OUT1, and a second electrode T22 of the second transistor T2 is connected to the second input terminal IN2; a gate electrode T30 of the third transistor T3 is connected to the first port a of the driving chip IC, a first electrode T31 of the third transistor T3 is connected to the second input terminal IN2, and a second electrode T32 of the third transistor T3 is connected to the second output terminal OUT2; and a gate electrode T40 of the fourth transistor T4 is connected to the second port b of the driving chip IC, a first electrode T41 of the fourth transistor T4 is connected to the second output terminal OUT2, and a second electrode T42 of the fourth transistor T4 is connected to the second input terminal IN2.

When the display panel 100 operates, the first port a outputs a signal for controlling the first transistor T1 and the third transistor T3, and the second port b outputs a signal for controlling the second transistor T2 and the fourth transistor T4. In this way, the first transistor T1 and the third transistor T3 can be controlled to be switched on or off at the same time by using only one port of the driving chip IC, and the second transistor T2 and the fourth transistor T4 can be controlled to be switched on or off at the same time by using only another port of the driving chip IC. That is, the first transistor T1 and the third transistor T3 can operate at the same time, and the second transistor T2 and the fourth transistor T4 can operate at the same time. Moreover, the first transistor T1 and the second transistor T2 operate in time division, and the third transistor T3 and the fourth transistor T4 operate in time division. In this way, during the first period of the force detection, the first transistor T1 and the third transistor T3 can operate in such a manner that the first transistor T1, the third transistor T3 and two first resistors R1 form a Wheatstone bridge; and during the second period of the force detection, the second transistor T2 and the fourth transistor T4 can operate in such a manner that the second transistor T2, the fourth transistor T4 and two first resistors R1 form a Wheatstone bridge. Thereafter, forces values detected during these two periods can be considered comprehensively, which can eliminate the influence of noise while improving accuracy of the force detection in the display panel 100.

Alternatively, as shown in FIG. 10, when the force sensor 1 includes two different types of transistors, the gate electrode T10 of the first transistor T1 is connected to the first port a of the driving chip IC, the first electrode T11 of the first transistor T1 is connected to the first output terminal OUT1, and the second electrode T12 of the first transistor T1 is connected to the second input terminal IN2; the gate electrode T20 of the second transistor T2 is connected to the first port a of the driving chip IC, the first electrode T21 of the second transistor T2 is connected to the first output terminal OUT1, and the second electrode T22 of the second transistor T2 is connected to the second input terminal IN2; the gate T30 of the third transistor T3 is connected to the second port b of the driving chip IC, the first electrode T31 of the third transistor T3 is connected to the second input terminal IN2, and the second electrode T32 of the third transistor T3 is connected to the second output terminal OUT2; and the gate T40 of the fourth transistor T4 is connected to the second port b of the driving chip IC, the first electrode T41 of the fourth transistor T4 is connected to the second output terminal OUT2, and the second electrode T42 of the fourth transistor T4 is connected to the second input terminal IN2.

When the display panel 100 operates, the first port a outputs a signal for controlling the first transistor T1 and the second transistor T2, and the second port b outputs a signal for controlling the third transistor T3 and the fourth transistor T4, so that the first transistor T1 can be switched on or off under the control of the signal transmitted via the first port a, and the third transistor T3 can be switched on or off under the control of the signal transmitted via the second port b. That is, it is needed to control the first transistor T1 and the third transistor T3 to be switched on or off at the same time via the two ports of the driving chip IC. Similarly, it is needed to control the second transistor T2 and the fourth transistor T4 to be switched on or off at the same time via the two ports of the driving chip IC. Then, the first transistor T1 and the third transistor T3 can operate at the same time, and the second transistor T2 and the fourth transistor T4 can operate at the same time. Moreover, the first transistor T1 and the second transistor T2 operate in time division, and the third transistor T3 and the fourth transistor T4 operate in time division. In this way, during the first period of the force detection, the first transistor T1 and the third transistor T3 can operate in such a manner that the first transistor T1, the third transistor T3 and two first resistors R1 form a Wheatstone bridge; and during the second period of the force detection, the second transistor T2 and the fourth transistor T4 can operate in such a manner that the second transistor T2, the fourth transistor T4 and two first resistors R1 form a Wheatstone bridge. Thereafter, force values detected during these two periods can be considered comprehensively, which can eliminate the influence of noise while improving accuracy of the force detection in the display panel 100.

For example, as shown in FIG. 12, the display panel 100 includes a display area 101 and a non-display area 102, and the force sensor 1 is disposed in the non-display area 102. A sealant 103 is provided in a portion of the non-display area 102 away from the display area 101. FIG. 13 is an enlarged view of a dotted box in FIG. 12. As illustrated, the two first resistors R1 are disposed in a portion of the non-display area 102 close to the sealant 103, and the first transistor T1, the second transistor T2, the third transistor T3, and the fourth transistor T4 are disposed in a portion of the non-display area 102 close to the display area 101. In the related art, resistors forming four bridge arms of a Wheatstone bridge all belong to force-sensitive resistors, resistance of which will change under the function of a stress. Since the sealant can absorb the stress, in order to improve detection accuracy of a force sensor, the force sensor is usually disposed in the display panel outside a region where the sealant is located, which leads to broader borders of the display panel. The present embodiment disposes two first resistors R1 having fixed resistances in the portion of the non-display area 101 close to the sealant. Since the resistances of the first resistors R1 are fixed, the absorption of the stress by the sealant will not lead to resistance changes of the first resistors R1. Hence, the present embodiment can improve utilization of regions near the sealant in the non-display area 102 of the display panel. Moreover, the first resistors R1 having fixed resistances in the force sensor 1 can be disposed to be partially close to the sealant, which can further narrow the borders of the display panel 100. Optionally, there is overlapping between a vertical projection of the sealant on the display panel and a vertical projection of the first resistors on the display panel, which can further narrow the borders of the display panel 100 without affecting effects of the force detection.

The embodiments of the present disclosure further provide a force detection method, as shown in FIG. 14. FIG. 14 is a flowchart showing a force detection method according to an embodiment of the present disclosure. The force detection method can be applied in the display panel 100 as described above, and can include steps as follows.

At step S1, during a first period of force detection, a switch-on signal is output to the first transistor and the third transistor and a switch-off signal is output to the second transistor and the fourth transistor. Then, a first force output value is obtained based on signals output from the first output terminal and the second output terminal.

At step S2, during a second period of force detection, a switch-off signal is output to the first transistor and the third transistor and a switch-on signal is output to the second transistor and the fourth transistor. Then, a second force output value is obtained based on signals output from the first output terminal and the second output terminal.

At step S3, a force detection value is obtained based on the first force output value and the second force output value.

Implementations and advantages of the force detection method according to the embodiments of the present disclosure have been described in the above embodiments, and will not be repeated here.

For example, obtaining a force detection value based on the first force output value and the second force output value in the above step S3 includes: obtaining a difference between the first force output value and the second force output value, as the force detection value. This can eliminate the influence of the surrounding noise on the force detection while improving accuracy of the force detection.

Figure 15:
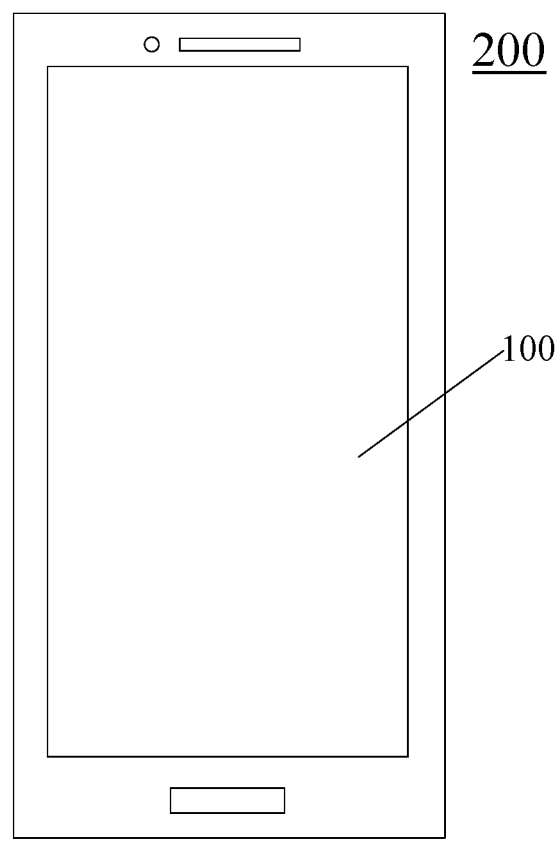
FIG. 15 is a schematic diagram showing a display device according to an embodiment of the present disclosure.

The embodiments of the present disclosure further provide a display device 200, as shown in FIG. 15. FIG. 15 is a schematic diagram showing a display device according to an embodiment of the present disclosure. The display device 200 includes the display panel 100 as described above.

Specific structures and principles of the display panel 100 are the same as those in the above embodiments and will not be repeated here. The display device 200 can be any electronic device with display function, such as a touch screen, a mobile phone, a tablet computer, a laptop, an e-book or a television.

With the display device 200 according to the embodiments of the present disclosure, the first and second transistors are connected in parallel between the first output terminal and the second input terminal of the force sensor, and the third and fourth transistors are connected in parallel between the second input terminal and the second output terminal. Moreover, the equivalent resistance of the first transistor is equal to that of the fourth transistor, and the equivalent resistance of the second transistor is equal to that of the third transistor. Moreover, in the force sensor according to the present disclosure, there is a first resistor connected between the first input terminal and the first output terminal and a first resistor connected between the second output terminal and the first input terminal. In this way, during the force detection, the first, second, third and fourth transistors can be controlled to be switched on in time division, so that during different periods of the force detection, different transistors can be involved in the force detection. In particular, during the first period of the force detection, a switch-on signal is output to the first transistor and the third transistor and a switch-off signal is output to the second transistor and the fourth transistor, so that the first transistor, the third transistor and two first resistors form four bridge arms of a Wheatstone bridge. During the second period of the force detection, a switch-off signal is output to the first transistor and the third transistor and a switch-on signal is output to the second transistor and the fourth transistor, so that the second transistor, the fourth transistor and two first resistors form four bridge arms of a Wheatstone bridge. Moreover, since the equivalent resistance of the first transistor is equal to that of the fourth transistor and the equivalent resistance of the second transistor is equal to that of the third transistor, theoretical force detection signal values output by the force sensor during the first and second periods of the force detection are opposite numbers. Considering the influence of noise caused by a peripheral circuit, a first actual force detection signal value output during the first period of the force detection is $U1=U+\sigma$, and a second actual force detection signal value output during the second period of the force detection is $U2=-U+\sigma$. Then, the present disclosure can obtain the force detection signal value having the influence of noise eliminated based on the first actual force detection signal value U1 and the second actual force detection signal value U2. For example, obtaining a difference between the first actual force detection signal value U1 and the second actual force detection signal value U2 can eliminate the influence of noise and improve accuracy of the force detection signal value output from the force sensor.

The above are merely preferred embodiments of the present disclosure, which, as mentioned above, are not used to limit the present disclosure. Whatever within the principles of the present disclosure, including any modification, equivalent substitution, improvement, etc. shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A force sensor, comprising:
   a first input terminal,
   a second input terminal,
   a first output terminal,
   a second output terminal,
   a first resistor connected between the first input terminal and the first output terminal,
   first and second transistors connected in parallel between the first output terminal and the second input terminal,
   third and fourth transistors connected in parallel between the second input terminal and the second output terminal, and
   a further first resistor connected between the second output terminal and the first input terminal,
   wherein an equivalent resistance of the first transistor is equal to an equivalent resistance of the fourth transistor, and an equivalent resistance of the second transistor is equal to an equivalent resistance of the third transistor.

2. The force sensor according to claim 1, wherein each of the first transistor, the second transistor, the third transistor, and the fourth transistor is a P-type transistor or an N-type transistor.

3. The force sensor according to claim 2, wherein each of the first transistor, the second transistor, the third transistor, and the fourth transistor comprises a gate electrode, a first electrode, and a second electrode,
   wherein the first electrode and the second electrode of the first transistor are arranged along a first direction, the first electrode and the second electrode of the third transistor are arranged along a second direction, the first electrode and the second electrode of the second transistor are arranged along the second direction, and the first electrode and the second electrode of the fourth transistor are arranged along the first direction, wherein the first direction is different from the second direction.

4. The force sensor according to claim 3, wherein the first direction is perpendicular to the second direction.

5. The force sensor according to claim 1, wherein each of the first transistor and the fourth transistor is a P-type transistor, and each of the second transistor and the third transistor is an N-type transistor; or each of the first transistor and the fourth transistor is an N-type transistor, and each of the second transistor and the third transistor is a P-type transistor.

6. The force sensor according to claim 5, wherein each of the first transistor, the second transistor, the third transistor, and the fourth transistor comprises a gate electrode, a first electrode, and a second electrode,
   wherein the first electrode and the second electrode of the first transistor are arranged along a first direction, the first electrode and the second electrode of the third transistor are arranged along a second direction, the first electrode and the second electrode of the second transistor are arranged along the second direction, and the first electrode and the second electrode of the fourth transistor are arranged along the first direction, wherein the first direction is identical to the second direction.

7. A display panel, comprising a force sensor, wherein the force sensor comprises:
   a first input terminal,
   a second input terminal,
   a first output terminal,
   a second output terminal,
   a first resistor connected between the first input terminal and the first output terminal,
   first and second transistors connected in parallel between the first output terminal and the second input terminal,
   third and fourth transistors connected in parallel between the second input terminal and the second output terminal, and
   a further first resistor connected between the second output terminal and the first input terminal,
   wherein an equivalent resistance of the first transistor is equal to an equivalent resistance of the fourth transistor, and an equivalent resistance of the second transistor is equal to an equivalent resistance of the third transistor.

8. The display panel according to claim 7, further comprising a driving chip, wherein a gate electrode of the first transistor is connected to a first port of the driving chip, a first electrode of the first transistor is connected to the first output terminal, and a second electrode of the first transistor is connected to the second input terminal,
   wherein a gate electrode of the second transistor is connected to a second port of the driving chip, a first electrode of the second transistor is connected to the first output terminal, and a second electrode of the second transistor is connected to the second input terminal,
   wherein a gate electrode of the third transistor is connected to the first port of the driving chip, a first electrode of the third transistor is connected to the second input terminal, and a second electrode of the third transistor is connected to the second input terminal, and
   wherein a gate electrode of the fourth transistor is connected to the second port of the driving chip, a first electrode of the fourth transistor is connected to the second output terminal, and a second electrode of the fourth transistor is connected to the second input terminal.

9. The display panel according to claim 7, further comprising a driving chip, wherein a gate electrode of the first transistor is connected to a first port of the driving chip, a first electrode of the first transistor is connected to the first output terminal, and a second electrode of the first transistor is connected to the second input terminal,
   wherein a gate electrode of the second transistor is connected to the first port of the driving chip, a first electrode of the second transistor is connected to the first output terminal, and a second electrode of the second transistor is connected to the second input terminal,
   wherein a gate electrode of the third transistor is connected to a second port of the driving chip, a first electrode of the third transistor is connected to the second input terminal, and a second electrode of the third transistor is connected to the second output terminal, and
   wherein a gate electrode of the fourth transistor is connected to the second port of the driving chip, a first electrode of the fourth transistor is connected to the second output terminal, and a second electrode of the fourth transistor is connected to the second input terminal.

10. The display panel according to claim 7, wherein the display panel comprises a display area and a non-display area, and the force sensor is disposed in the non-display area, wherein a sealant is provided in a portion of the non-display area away from the display area, the first resistor and the further first resistor are disposed in a portion of the non-display area close to the sealant, and the first transistor, the second transistor, the third transistor, and the fourth transistor are disposed in a portion of the non-display area close to the display area.

11. A force detection method applied in a display panel, wherein the display panel comprise a force sensor comprising:
    a first input terminal,
    a second input terminal,
    a first output terminal,
    a second output terminal,
    a first resistor connected between the first input terminal and the first output terminal,
    first and second transistors connected in parallel between the first output terminal and the second input terminal,
    third and fourth transistors connected in parallel between the second input terminal and the second output terminal, and
    a further first resistor connected between the second output terminal and the first input terminal,
    wherein an equivalent resistance of the first transistor is equal to an equivalent resistance of the fourth transistor, and an equivalent resistance of the second transistor is equal to an equivalent resistance of the third transistor; and wherein the force detection method comprises:
    during a first period of force detection, outputting a switch-on signal to the first transistor and the third transistor and outputting a switch-off signal to the second transistor and the fourth transistor; and obtaining a first force output value based on signals output from the first output terminal and the second output terminal;
    during a second period of force detection, outputting a switch-off signal to the first transistor and the third transistor and outputting a switch-on signal to the second transistor and the fourth transistor; and obtaining a second force output value based on signals output from the first output terminal and the second output terminal; and
    obtaining a force detection value based on the first force output value and the second force output value.

12. The force detection method according to claim 11, wherein obtaining a force detection value based on the first force output value and the second force output value comprises:
    obtaining a difference between the first force output value and the second force output value, as the force detection value.

* * * * *